United States Patent
Miyatake et al.

(10) Patent No.: US 9,086,542 B2
(45) Date of Patent: Jul. 21, 2015

(54) LAMINATED POLARIZING PLATE, METHOD FOR PRODUCTION THEREOF AND LIQUID CRYSTAL DISPLAY

(75) Inventors: Minoru Miyatake, Osaka (JP); Kentarou Takeda, Osaka (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 366 days.

(21) Appl. No.: 12/601,154

(22) PCT Filed: Jun. 12, 2008

(86) PCT No.: PCT/JP2008/060770
§ 371 (c)(1),
(2), (4) Date: Nov. 20, 2009

(87) PCT Pub. No.: WO2009/004908
PCT Pub. Date: Jan. 8, 2009

(65) Prior Publication Data
US 2010/0157195 A1 Jun. 24, 2010

(30) Foreign Application Priority Data
Jun. 29, 2007 (JP) ................................. 2007-172649

(51) Int. Cl.
*G02F 1/1335* (2006.01)
*G02B 5/30* (2006.01)
(Continued)

(52) U.S. Cl.
CPC .......... *G02B 5/3033* (2013.01); *B29D 11/0073* (2013.01); *B29D 11/00644* (2013.01); *G02F 1/13362* (2013.01); *G02F 1/13363* (2013.01); *G02F 1/133536* (2013.01);
(Continued)

(58) Field of Classification Search
CPC ................... G02F 1/133528; G02F 1/133536; G02F 2001/133531; G02B 5/3033
See application file for complete search history.

(56) References Cited

U.S. PATENT DOCUMENTS

| 5,739,296 | A | 4/1998 | Gvon et al. |
| 6,096,375 | A | 8/2000 | Ouderkirk et al. |
| 6,174,394 | B1 | 1/2001 | Gvon et al. |

(Continued)

FOREIGN PATENT DOCUMENTS

| JP | 59086028 A | * 5/1984 | ............. G02F 1/133 |
| JP | 08-511109 A | 11/1996 | |

(Continued)

OTHER PUBLICATIONS

International Search Report of PCT/JP2008/060770, mailing date of Sep. 2, 2008.

(Continued)

*Primary Examiner* — Jessica M Merlin
(74) *Attorney, Agent, or Firm* — Westerman, Hattori, Daniels & Adrian, LLP

(57) ABSTRACT

The invention relates a long laminated polarizing plate (PL) comprising at least one reflective linear polarizer (Pr) having a transmission axis parallel to the longitudinal direction of the film, and at least one absorptive polarizer (Pa) having a transmission axis parallel to the longitudinal direction. In this long laminated polarizing plate (PL), the reflective linear polarizer (Pr) and the absorptive polarizer (Pa) are arranged such that their transmission axes are parallel to each other. The long laminated polarizing plate of the invention is excellent in productivity and is applicable to a large-sized liquid crystal display.

16 Claims, 3 Drawing Sheets

(51) Int. Cl.
  *B29D 11/00* (2006.01)
  *G02F 1/13363* (2006.01)
(52) U.S. Cl.
  CPC .............. *G02F 2001/133531* (2013.01); *G02F 2001/133545* (2013.01); *G02F 2202/04* (2013.01); *Y10T 156/10* (2015.01)

(56) References Cited

U.S. PATENT DOCUMENTS

| | | | |
|---|---|---|---|
| 6,245,399 B1 * | 6/2001 | Sahouani et al. | 428/1.31 |
| 2003/0137633 A1 | 7/2003 | Ito et al. | |
| 2004/0214986 A1 | 10/2004 | Lazarev | |
| 2005/0122587 A1 | 6/2005 | Ouderkirk et al. | |
| 2006/0164579 A1 | 7/2006 | Yano | |
| 2006/0262400 A1 | 11/2006 | Ouderkirk et al. | |
| 2006/0292315 A1 | 12/2006 | Inagaki et al. | |
| 2007/0024970 A1 * | 2/2007 | Lub et al. | 359/487 |
| 2007/0121027 A1 * | 5/2007 | Lee et al. | 349/61 |
| 2007/0153163 A1 * | 7/2007 | Ito | 349/96 |
| 2007/0234954 A1 * | 10/2007 | Ciliske et al. | 118/621 |
| 2007/0252926 A1 * | 11/2007 | Watson et al. | 349/98 |

FOREIGN PATENT DOCUMENTS

| | | |
|---|---|---|
| JP | 09-507308 A | 7/1997 |
| JP | 11-160538 A | 6/1999 |
| JP | 11-183726 A | 7/1999 |
| JP | 2001-330726 A | 11/2001 |
| JP | 2002-028939 A | 1/2002 |
| JP | 2002-127245 A | 5/2002 |
| JP | 2002-131533 A | 5/2002 |
| JP | 2002-341343 A | 11/2002 |
| JP | 2003-207628 A | 7/2003 |
| JP | 2004-262071 A | 9/2004 |
| JP | 2005-352403 A | 12/2005 |
| JP | 2006-524348 A | 10/2006 |
| JP | 2007-057877 A | 3/2007 |
| TW | 200714642 A | 11/1996 |
| TW | 575743 B | 2/2004 |
| TW | 1279609 B | 4/2007 |
| WO | 95/17691 A1 | 6/1995 |

OTHER PUBLICATIONS

Notification of Transmittal of Translation of the International Preliminary Report on Patentability (form PCT/IB/338) of International Application No. PCT/JP2008/060770 mailed Feb. 4, 2010 with Forms PCT/IB/373 and PCT/ISA/237.

Japanese Office Action dated Feb. 2, 2012. issued in corresponding Japanese Patent Application No. 2007-172649.

Japanese Office Action dated Jul. 10, 2012. issued in corresponding Japanese Patent Application No. 2007-172649, with English translation (4 pages).

Japanese Office Action dated Nov. 9, 2012, issued in corresponding Japanese Patent Application No. 2007-172649, with English translation.

Taiwanese Office Action dated Oct. 23, 2014, issued in corresponding Taiwanese Application No. 097123957; w/ English Translation. (5 pages).

* cited by examiner

LAMINATED POLARIZING PLATE, METHOD FOR PRODUCTION THEREOF AND LIQUID CRYSTAL DISPLAY

TECHNICAL FIELD

The invention relates to a laminated polarizing plate including a laminate of a reflective linear polarizer and an absorptive polarizer and to a liquid crystal display therewith.

BACKGROUND ART

Liquid crystal displays have a structure including a liquid crystal cell held between two polarizing plates. In normally black mode liquid crystal displays, which display black image when the liquid crystal cell voltage is OFF, two polarizing plates (P1 and P2) are so placed that their transmission axes are orthogonal to each other as shown in FIG. 3. Polarizing plates are generally produced in the form of long films by a continuous process, and therefore, the film width is limited to at most few meters and generally limited to about 1 m. In recent years, however, a demand for larger screen liquid crystal displays has been increasing, and therefore, for example, polarizing plates applicable to displays with a diagonal size of more than 65 inches (about 1,640 mm) have been demanded. One of the most popular large screen televisions is of a wide type with a width-to-length ratio of 9:16. When two polarizing plates are placed with their transmission axes orthogonal to each other in such a liquid crystal display having a screen with different vertical and horizontal lengths, the width of one polarizing plate has to differ from that of the other polarizing plate in order to hold a liquid crystal cell between them, because they are each anisotropic. As shown in FIG. 1A, for example, when both the light source-side polarizing plate and the viewer-side polarizing plate to be used are cut from long polarizing plates (P11 and P12) each having a transmission axis in the direction of the width of the long film, one polarizing plate (P21) has to be cut in such a manner that the width of the long polarizing plate will correspond to the long side, and the other polarizing plate (P22) has to be cut in such a manner that the width of the long polarizing plate will correspond to the short side, so that two polarizing plates of the same size and with their transmission axes orthogonal to each other can be obtained. In this case, therefore, the length of the long side of the liquid crystal display is limited within the width of the polarizing plate, and, for example, a polarizing plate with a width of 1,400 mm or more is necessary for a 65 inch size television.

For such application to large screen liquid crystal displays, known methods include using a wide polyvinyl alcohol (PVA) film as a substrate (see for example Patent Literature 1), performing transverse stretching in the process of manufacturing a polarizing plate (see for example Patent Literature 2) and other methods of extending the width of the polarizing plate. However, wide films tend to have low uniformity or handleability, and the cost of facilities for the production of such a long wide film will be high. Therefore, such known methods are less practical.

On the other hand, as shown in FIG. 1B, for example, a long polarizing plate (P13) having a transmission axis in the longitudinal direction and another long polarizing plate (P14) having a transmission axis in the width direction may be used as a light source-side polarizing plate and a viewer-side polarizing plate, respectively. In this case, polarizing plates (P23 and P24) may be cut in such a manner that the widths of both long polarizing plates will correspond to the short side of a liquid crystal display, so that two polarizing plates of the same size and with their transmission axes orthogonal to each other can be obtained. Thus, the length of the short side of the liquid crystal display only has to be within the width of the polarizing plate, and this technique is applicable to the production of large screen liquid crystal displays without extending the width of the long polarizing plate, in contrast to the case shown in FIG. 1A. Examples of the polarizing plate having a transmission axis in the width direction include iodine polarizing plates that are produced by allowing iodine to adsorb to a hydrophilic polymer film such as a polyvinyl alcohol film and uniaxially stretching the film in the longitudinal direction. A commercialized polarizer having a transmission axis in the longitudinal direction is a reflective linear polarizer produced by transversely stretching a resin laminate of two or more layers produced with two or more birefringent resins, such as D-BEF commercially available from 3M.

However, the reflective linear polarizer such as D-BEF has the disadvantage that it reduces visibility, when it is incorporated in a liquid crystal display so as to reflect external light. Thus, a laminated polarizing plate is disclosed in which a reflective linear polarizer and an absorptive polarizer such as an iodine polarizer are so placed that their transmission axes coincide with each other (see for example Patent Literature 3). However, since the iodine-based absorptive polarizer (Pa) has a transmission axis in the width direction as mentioned above, as shown in FIG. 2A, the lamination of the long absorptive polarizer (Pa) itself and a reflective linear polarizer (Pr) having a transmission axis in the longitudinal direction, such as D-BEF, cannot make their transmission axes parallel to each other. In order to make their transmission axes parallel to each other, pieces of the polarizers have to be cut one by one in forming a laminate, and therefore, a long polarizing plate is not obtainable, which leads to low productivity. In addition, when an absorptive polarizer having a transmission axis in the width direction, such as an iodine polarizing plate, is used, there is a problem in which the length of the long side of the liquid crystal display is limited within the width of the polarizing plate as in the case shown in FIG. 1A.

Patent Literature 1: Japanese Patent Application Laid-Open (JP-A) No. 2002-28939
Patent Literature 2: JP-A No. 11-183726
Patent Literature 3: Japanese Patent Application National Publication (Laid-Open) No. 09-507308

DISCLOSURE OF THE INVENTION

Problems to be Solved by the Invention

In view of the above, an object of the invention is to provide a long laminated polarizing plate suitable for use in large liquid crystal displays and to provide a liquid crystal display using such a long laminated polarizing plate.

Means for Solving the Problems

As a result of investigations, the inventors have made the invention based on the finding that the specified laminated polarizing plate can solve the problems described above. This invention relates to a long laminated polarizing plate, comprising at least one layer of a reflective linear polarizer having a transmission axis parallel to the longitudinal direction of the film, and at least one layer of an absorptive polarizer having a transmission axis parallel to the longitudinal direction of the film, wherein both the transmission axes are arranged parallel to each other.

Further, at a wavelength of 550 nm, the absorptive polarizer preferably has an absorbance of 0.2 or less for linearly polarized light in the direction of the transmission axis and an absorbance of 0.5 to 2.5 for linearly polarized light in the direction of the absorption axis.

In addition, the reflective linear polarizer preferably has a polarization degree of 80% or more.

The absorptive polarizer preferably contains at least one of a material having a fixed orientation and lyotropic liquid crystal properties, a homogeneously-oriented thermotropic liquid crystal polymer, and a homogeneously-oriented crosslinking liquid crystal polymer.

A film width of the long laminated polarizing plate of the invention is preferably 850 mm or more.

Further, the invention relates to a method of producing the long laminated polarizing plate. In a first preferable embodiment, the method for producing the long laminated polarizing plate comprises steps of: applying, to a long substrate, a solution containing a dichroic dye having lyotropic liquid crystal properties, while applying shear in the longitudinal direction of the long substrate, and fixing an orientation, so that an absorptive polarizer is formed; and placing the absorptive polarizer on a reflective linear polarizer having a transmission axis parallel to the longitudinal direction of the film.

In a second preferable embodiment, the method for producing the long laminated polarizing plate comprises a steps of: applying a solution containing a dichroic dye having lyotropic liquid crystal properties to a reflective linear polarizer having a transmission axis parallel to the longitudinal direction of the film, while applying shear in the longitudinal direction of the reflective linear polarizer, and fixing an orientation, so that an absorptive polarizer is formed.

In a third preferable embodiment, the method for producing the long laminated polarizing plate comprises steps of: applying a solution containing a liquid crystal monomer having a polymerizable functional group and a dichroic dye to a long oriented substrate having an orientation axis in the width direction; polymerizing the liquid crystal monomer to produce a homogenous orientation, so that an absorptive polarizer having a transmission axis parallel to the longitudinal direction of the film is formed; and placing the absorptive polarizer on a reflective linear polarizer having a transmission axis parallel to the longitudinal direction of the film.

In a forth preferable embodiment, the method for producing the long laminated polarizing plate comprises steps of: applying a solution containing a thermotropic liquid crystal polymer and a dichroic dye to a long oriented substrate having an orientation axis in the width direction; heating the liquid crystal polymer to its liquid crystal transition temperature or higher; then cooling the liquid crystal polymer to fix its orientation so that the polymer is homogeneously oriented to form an absorptive polarizer having a transmission axis parallel to the longitudinal direction of the film; and placing the absorptive polarizer on a reflective linear polarizer having a transmission axis parallel to the longitudinal direction of the film.

In third and forth embodiment of the method above, it is preferable that the long oriented substrate is a stretched film that is stretched at least in the width direction.

In first, third and forth embodiment of the method above, it is preferable that the reflective linear polarizer and the absorptive polarizer are placed on each other by a roll-to-roll process in such a manner that their transmission axes are parallel to each other.

Furthermore, the invention relates to a liquid crystal display using the long laminated polarizing plate. In a liquid crystal display of the invention, it is preferable that a light source, a light source-side polarizing plate, a liquid crystal cell and a viewer-side polarizing plate are placed in this order and the light source-side polarizing plate is a cut piece of the long laminated polarizing plate. It is also preferable that the reflective linear polarizer is located on a side close to the light source, the absorptive polarizer is located on a side close to the liquid crystal cell, and the viewer-side polarizing plate is an iodine polarizing plate.

Further, in the liquid crystal display of the invention, the light source-side polarizing plate preferably has a transmission axis parallel to a long side of the liquid crystal display, and the viewer-side polarizing plate preferably has a transmission axis parallel to a short side of the liquid crystal display.

Effect of the Invention

The long laminated polarizing plate of the invention has high productivity and is suitable for use in large liquid crystal displays, because of the transmission axes parallel to the longitudinal direction of the film.

BRIEF DESCRIPTION OF THE DRAWINGS

FIGS. 2A and 2B each schematically show the concept of the lamination of a reflective linear polarizer (Pr) and an absorptive polarizer (Pa), in which FIG. 2A shows a conventional technique, FIG. 2B shows the long laminated polarizing plate (PL) of the invention, and the double-head arrows each indicate the direction of the transmission axis of each polarizer.

DESCRIPTION OF REFERENCE CHARACTERS

Pa absorptive polarizer
Pb absorptive polarizing plate
Pr reflective linear polarizer
PL long laminated polarizing plate
P1 light source-side polarizing plate
P2 viewer-side polarizing plate
BL light source
LC liquid crystal cell

BEST MODE FOR CARRYING OUT THE INVENTION

Figure 2A:
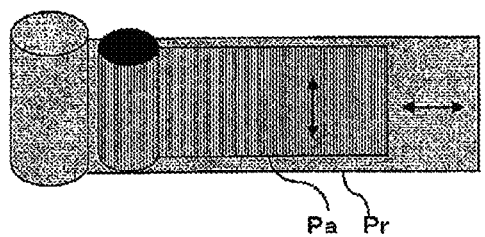
Figure 2B:
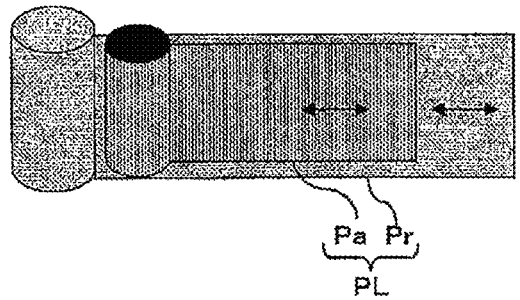

As shown in FIG. 2B, a long laminated polarizing plate (PL) according to an embodiment of the invention includes a reflective linear polarizer (Pr) having a transmission axis parallel to the longitudinal direction of the film and an absorptive polarizer (Pa) having a transmission axis parallel to the longitudinal direction of the film, wherein they are so arranged that their transmission axes are parallel to each other.

For the production of a long laminated polarizing plate, the transmission axes of the reflective linear polarizer (Pr) and the absorptive polarizer (Pa) are each parallel to the longitudinal direction of the film, specifically parallel to the film feeding direction. In view of productivity, it is preferred that they have been each wound into a roll. The term "long" means that the product is produced by a continuous process, though it may have an arbitrary length. In view of applicability to large liquid crystal displays, the length is preferably 1,500 mm or more. The length has no upper limit, because it is obtained by a continuous process, and it can be easily increased by a continuous process. The width of the film is preferably 850 mm or more in view of the applicability to large liquid crystal displays with a size of 65 inches or more, while it has no particular lower limit. The width of the film is preferably 2,500 mm or less, more preferably 2,000 mm or less, in view of the production of a highly uniform film, while it has no particular upper limit.

In the long laminated polarizing plate of the invention, the transmission axes of the reflective linear polarizer and the absorptive polarizer are parallel to each other. Therefore, the long laminated polarizing plate of the invention can efficiently use light from the light source side to improve the brightness and can suppress the reflection of light from the viewer side to produce a highly visible display, when it is incorporated in a liquid crystal display as described in page 9 line 26 to page 10 line 15 in the description of Japanese Patent Application National Publication (Laid-Open) No. 09-507308 and as shown in FIG. 1 of the publication. In addition, the long laminated polarizing plate can be obtained by continuous lamination according to a roll-to-roll process or the like, because both of the transmission axes of the reflective linear polarizer and the absorptive polarizer are parallel to the longitudinal direction.

Figure 1A:
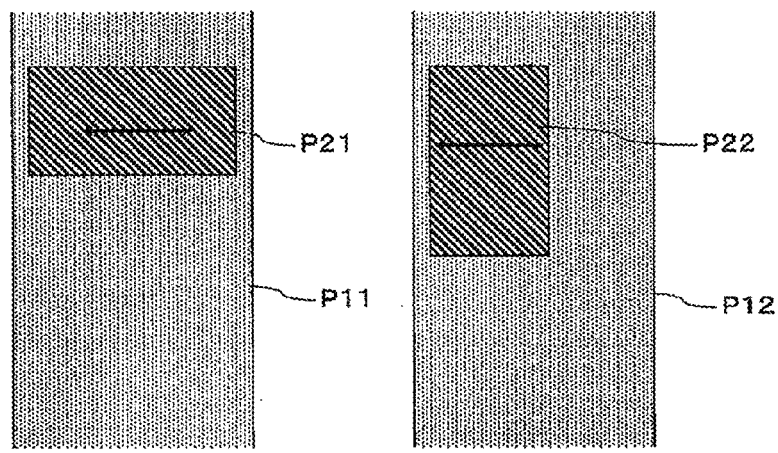
FIGS. 1A and 1B are each a conceptual diagram schematically showing a method for cutting a polarizing plate for use in a liquid crystal display from a long polarizing plate, in which FIG. 1A schematically shows a case where two polarizing plates (P21 and P22) of the same size and with their transmission axes orthogonal to each other are cut from conventional long polarizing plates (P11 and P12) each having a transmission axis in the width direction, FIG. 1B schematically shows a case where two polarizing plates (P23 and P24) of the same size and with their transmission axes orthogonal to each other are cut from a long polarizing plate (P13) having a transmission axis in the longitudinal direction and another long polarizing plate (P14) having a transmission axis in the width direction, respectively, and the double-head arrows each indicate the direction of the transmission axis of each polarizer.
Figure 1B:
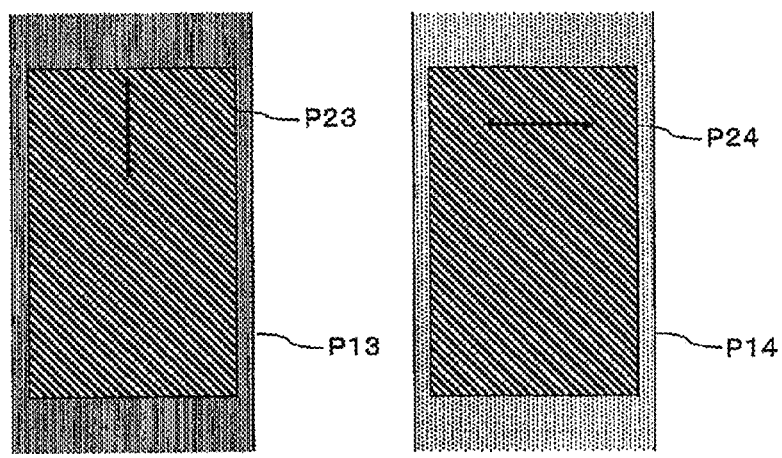
Figure 3:
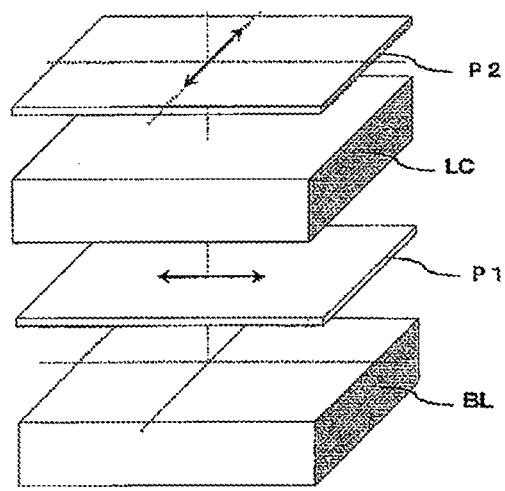
FIG. 3 is a conceptual diagram showing an example of the arrangement of polarizing plates in a normally black mode liquid crystal display, in which the double-head arrows each indicate the direction of the transmission axis of each polarizing plate.
Figure 4:
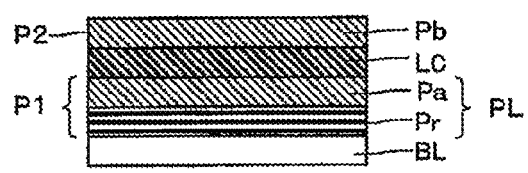
FIG. 4 is a conceptual diagram showing an example of the cross-section of the structure of a liquid crystal display using the long laminated polarizing plate (PL) of the invention.

The long laminated polarizing plate of the invention is also suitable for use in large-screen liquid crystal displays, because of the transmission axis direction parallel to the longitudinal direction of the film. As shown in FIG. 3, a normally black mode liquid crystal display includes a light source-side polarizing plate (P1) and a viewer-side polarizing plate (P2) that are so arranged that their transmission axes are orthogonal to each other. As shown in FIG. 4, the long laminated polarizing plate (PL) of the invention may be used as the light source-side polarizing plate (P1) and so placed that the reflective linear polarizer (Pr) is located on the side close to a light source (BL) and the absorptive polarizer (Pa) is located on the side close to a liquid crystal cell (LC), while a polarizing plate (Pb) containing iodine or the like and having a transmission axis in the width direction is used as the viewer-side polarizing plate (P2). As shown in FIG. 1B, according to this arrangement, two polarizing plates (P23, P24) of the same size and with their transmission axes orthogonal to each other can be obtained by cutting from a long polarizing plate (P13) having a transmission axis in the longitudinal direction and another polarizing plate (P14) having a transmission axis in the width direction, respectively, and the width direction of the long polarizing plate can be aligned with the short side direction of the liquid crystal display. Therefore, this arrangement is applicable to larger-screen liquid crystal displays without requiring any increase in the width of the long polarizing plate, in contrast to the case shown in FIG. 1A where two long polarizing plates each having a transmission axis in the width direction are used.

Of linearly polarized light beams orthogonal to each other, a polarized light beam having a vibration plane parallel to the transmission axis is transmitted as it is through the reflective linear polarizer used in the long laminated polarizing plate of the invention, while a polarized light beam having a vibration plane parallel to the reflection axis is selectively reflected by the reflective linear polarizer. In order to increase the visibility of liquid crystal displays, the reflective linear polarizer preferably has a polarization degree of 80% or more, more preferably 85% or more, even more preferably 90% or more. The polarization degree may be increased by increasing the number of layers in the resin laminate as described later or selecting a combination of materials having high birefringence. The polarization degree may also be increased by using a laminate of two or more reflective linear polarizers with their transmission axes parallel to one another.

Examples of the reflective linear polarizer include a grid polarizer, a multilayer thin film laminate having two or more layers of two or more materials different in refractive index, a vapor-deposited multilayer thin film having layers different in refractive index, which has been used in beam splitters, a birefringent multilayer thin film laminate having two or more layers of two or more birefringent materials, and a stretched resin laminate having two or more layers of two or more birefringent resins. In particular, for example, a uniaxially-stretched multilayer laminate is preferably used, which is obtained by a process including forming a multilayer laminate by alternately placing a material to produce a high retardation by stretching, such as polyethylene naphthalate, polyethylene terephthalate or polycarbonate, and another material to produce a low retardation by stretching, such as acrylic resin such as poly(methyl methacrylate) or norbornene resin such as Arton manufactured by JSR Corporation, and uniaxially stretching the multilayer laminate. A product obtained by transversely stretching a resin laminate of two or more layers of two or more birefringent resins is preferably used, because a long product having a transmission axis in the longitudinal direction is available. Examples of such a product include D-BEF series manufactured by 3M and so on. The reflective linear polarizer generally has a thickness of about 50 to about 200 μm.

Of linearly polarized light beams orthogonal to each other, a polarized light beam having a vibration plane parallel to the transmission axis is transmitted as it is through the absorptive polarizer used in the long laminated polarizing plate of the invention, while a polarized light beam having a vibration plane parallel to the absorption axis is selectively absorbed by the absorptive polarizer. In order to increase the white luminance of liquid crystal displays, the absorptive polarizer preferably has an absorbance of 0.20 or less, more preferably 0.15 or less, for linearly polarized light in the transmission axis direction. In order to reduce the black luminance of liquid crystal displays, the absorptive polarizer preferably has an absorbance of 0.50 or more, more preferably 0.80 or more, even more preferably 1.0 or more, for linearly polarized light in the absorption axis direction. The absorbance in the absorption axis direction has no upper limit, but if it is too high, the absorbance in the transmission axis direction may also be high. Therefore, it is preferably 2.5 or less, more preferably 2.0 or less.

Examples of the absorptive polarizer include a product obtained by a process including allowing a dichroic material to adsorb to a hydrophilic polymer film and then transversely stretching the film, an oriented dichroic dye having lyotropic liquid crystal properties, a material containing a dichroic dye oriented in a matrix of a homogeneously oriented thermotropic liquid crystal polymer or a matrix of a homogeneously oriented crosslinking liquid crystal polymer, and so on.

Among the examples of the absorptive polarizer, an absorptive polarizer having undergone an orientation process other than stretching is preferably used in the long laminated polarizing plate of the invention. Stretched films tend to be reduced in orientation by heat or to cause a dimensional change by heat and therefore may cause a reduction in polarization degree, the separation of a component from a liquid crystal panel, or warping of a liquid crystal panel. The long laminated polarizing plate of the invention is generally used as the light source-side polarizing plate located close to a light source and therefore is more susceptible to heat from the light source than the viewer-side polarizing plate. As described above, therefore, the absorptive polarizer preferably has undergone an orientation and fixation process other than stretching. From this point of view, the absorptive polarizer to be used is preferably an oriented dichroic dye having lyotropic liquid crystal properties or a material containing a dichroic dye oriented in a matrix of a homogeneously oriented thermotropic liquid crystal polymer or a matrix of a homogeneously oriented crosslinking liquid crystal polymer.

In particular, the oriented dichroic dye having lyotropic liquid crystal properties corresponds to the so-called E-type polarizer and contributes to widening the viewing angle of liquid crystal displays. Specifically, when an E-type polarizer and an O-type polarizer such as an iodine type are used as the light source-side polarizer and the viewer-side polarizer, respectively, light leakage in oblique directions can be prevented as described, for example, in International Publication Nos. WO01/63346 and WO01/81991. In the long laminated polarizing plate of the invention, therefore, the oriented dichroic dye having lyotropic liquid crystalline properties is particularly preferably used as the absorptive polarizer in terms of widening the viewing angle of liquid crystal displays.

Examples of the oriented dichroic dye having lyotropic liquid crystal properties include oriented water-soluble organic dyes represented by the formula: (chromogen) $(SO_3M)_n$ in which the chromogen contains an azo compound, a polycyclic compound or the like to impart liquid crystalline properties, the sulfonic acid or salt thereof imparts water-solubility, and the whole has lyotropic liquid crystal properties. Examples of such a dichroic dye include those described in Japanese Patent Application National Publication (Laid-Open) Nos. 08-511109, 2002-515075, and 2006-524348. Commercially available products include the product sold under the name of LC Polarizer by Optiva, Inc.

Other examples that may be used similarly to the lyotropic liquid-crystalline dichroic dye include dichroic dye-containing lyotropic materials such as products obtained by forming a coating of a solution of a dichroic dye-containing lyotropic material as described in International Publication No. WO97/39380 in such a manner that the material is allowed to flow and oriented. For example, such a dichroic dye-containing lyotropic material is commercially available from Russian Technology Group.

Such an absorptive polarizer may be produced by a process including using a long film as a substrate (hereinafter also referred to as "a long substrate"), applying a lyotropic liquid-crystalline dichroic dye-containing solution to the long substrate, while applying shear in the longitudinal direction of the long substrate to the solution, and fixing the orientation.

In an embodiment of the invention, a long reflective linear polarizer having a transmission axis in the longitudinal direction is particularly preferably used as the long substrate. When such a reflective linear polarizer is used, the absorptive polarizer can be formed on the reflective linear polarizer, which does not require the laminating process described later so that high productivity can be obtained.

Besides the reflective linear polarizer, examples of substrates that may be used as the long substrate include, but are not limited to, films of transparent polymers such as polyester based polymers such as polyethylene terephthalate and polyethylene naphthalate, cellulose based polymers such as diacetylcellulose and triacetylcellulose, polycarbonate based polymers, acryl based polymers such as poly(methyl methacrylate), styrene based polymers such as polystyrene and acrylonitrile-styrene copolymers, olefin based polymers such as polyethylene, polypropylene, cyclic or norbornene structure-containing polyolefins, and ethylene-propylene copolymers, vinyl chloride based polymers, amide based polymers such as nylon and aromatic polyamide, imide based polymers, sulfone based polymers, polyether sulfone based polymers, polyether ether ketone based polymers, polyphenylene sulfide based polymers, vinyl alcohol based polymers, vinylidene chloride based polymers, vinyl butyral based polymers, acrylate based polymers, polyoxymethylene based polymers, and epoxy based polymers, or any blend thereof. When these long substrates are used, the long laminated polarizing plate may be obtained by a process including forming an absorptive polarizer on the long substrate and then placing the resulting absorptive polarizer on a reflective linear polarizer having a transmission axis parallel to the longitudinal direction of the film. After the placement on the reflective linear polarizer, the long substrate, which has been used in forming the absorptive polarizer, may be separated, or may be integrated with the long laminated polarizing plate of the invention without being separated therefrom and used as a protective layer for the polarizer or as an optical function layer or the like.

Methods for applying the lyotropic liquid-crystalline dichroic dye-containing solution to the substrate include, but are not limited to, coating methods which are performed while the long substrate is moved in the longitudinal direction, such as bar coating, gravure coating, and lip coating. Such methods are preferably used to apply shear to the solution in the longitudinal direction of the long substrate. Such coating methods are further preferred, because they allow the production of long films.

Before the coating process, if necessary, the long substrate may be previously subjected to surface treatment such as alkali treatment, primer treatment, corona treatment, plasma treatment, ultraviolet treatment, or solvent resistance imparting treatment. In particular, when an absorptive polarizer is directly formed on a reflective linear polarizer, primer treatment, corona treatment, plasma treatment, or the like is preferably performed to improve the adhesion.

Examples of the material containing a dichroic dye oriented in a homogeneously oriented thermotropic liquid crystal polymer or in a homogeneously oriented crosslinking liquid crystal polymer include those described in JP-A Nos. 11-101964, 11-160538, 2001-330726, 2001-133630, and 2005-99065, and Nitto Giho, Vol. 135, No. 1, p. 79 (1997). Such an absorptive polarizer may be obtained by a method including applying a solution of a thermotropic liquid crystal polymer and a dichroic dye to a long oriented substrate having an orientation axis in the width direction, heating the solution to a temperature equal to or higher than the liquid crystal transition temperature, and then cooling it to fix the orientation; or a method including applying a mixture of a liquid crystal monomer having a polymerizable functional group and a dichroic dye to a long oriented substrate having an orientation axis in the width direction and polymerizing the liquid crystal monomer by ultraviolet irradiation or the like in the presence of a polymerizable initiator or the like to provide orientation.

For the purpose of obtaining a polarizer with a particularly high polarization degree, a product obtained by polymerizing a liquid crystal monomer by ultraviolet irradiation or the like is preferably used, in which the liquid crystal monomer is more preferably a cross-linkable liquid crystal monomer having two or more polymerizable functional groups. In this way, the dichroic dye is also oriented in the width direction as the liquid crystal polymer is homogeneously oriented in the width direction on the long oriented substrate, so that an absorptive polarizer having an absorption axis in the width direction and a transmission axis in the longitudinal direction is obtained.

The dichroic dye exhibits different polarization degrees for incident light in the directions of the long and short axes of the molecule. In accordance with the uniaxial orientation of the liquid crystal polymer or the like, the long axis of the dichroic dye molecule can be aligned in the specific direction so that the molecule can selectively absorb and transmit vibrational components of incident light to convert them into polarized light. Preferred examples of dyes with such high dichroic ratios include azo, perylene, and anthraquinone dyes, and dye mixtures thereof, which are preferably used in dye polarizers and described in detail, for example, in JP-A No. 54-76171. As an alternative to mixing the dichroic dye into the liquid crystal polymer matrix, for example, the absorptive polarizer may be obtained by homogeneously orienting a liquid crystalline dichroic dye-containing material as described in JP-A No. 2005-140986.

One or two or more dichroic dyes may be used depending on the wavelength range of the polarization properties or the like and generally used in an amount of 1 to 20% by weight, based on the amount of the liquid crystal polymer or the liquid crystal monomer.

An absorptive polarizer having an absorption axis in the width direction and therefore having a transmission axis in the longitudinal direction should be obtained by homogeneously orienting the liquid crystalline molecule in the width direction. For this purpose, the long oriented substrate to be used should be previously subjected to an orientation process as described above. Examples of the orientation process for the long oriented substrate include rubbing a thin film of a polymer such as polyvinyl alcohol or polyimide, oblique vapor-deposition of $SiO_x$ or $In_2O_3/SnO_2$, a method of forming any of various alignment films such as a thin film of polytetrafluoroethylene or the like formed by a friction-transfer technique and a photo-alignment film, and a method of stretching a film. In view of the production of a long film by a continuous process, a film stretched at least in the width direction is preferably used.

The same material as the substrate used for the lyotropic liquid crystalline absorptive polarizer is preferably used for the long oriented substrate. For the production of a long absorptive polarizer, coating methods which are performed while the substrate is moved are preferably used, such as bar coating, gravure coating, and lip coating.

The reflective linear polarizer and the absorptive polarizer each having a transmission axis in the longitudinal direction of the film are laminated with their transmission axes parallel to each other so that the laminated polarizing plate is obtained. For the production of the long laminated polarizing plate and in view of easiness of the control of the parallel relationship between the axes, the lamination is preferably achieved by a method including laminating materials for forming the respective polarizers and then performing a process to simultaneously producing the polarization functions (for example, a stretching process), a method of forming an additional layer on a layer, or a method of continuously forming a laminate by a roll-to-roll process. In view of the control of the polarization properties, it is particularly preferred that the reflective linear polarizer and the absorptive polarizer each independently provided be laminated by a roll-to-roll process. Before the lamination, if necessary, surface treatment such as alkali treatment, primer treatment, corona treatment, plasma treatment, or ultraviolet treatment may be previously performed to control the adhering strength (adhesion). Solvent-resistant coating or hard coating may also be performed to impart solvent resistance or increase the surface hardness.

Figure 5A:
FIGS. 5A, 5B and 5C are conceptual diagrams each showing the cross-section of a structure in each step of the process of forming the long laminated polarizing plate (PL) of the invention by a transfer method.
Figure 5B:
Figure 5C:

The method of forming a laminate by a roll-to-roll process also includes a method of forming a laminate by transfer. For example, such a method may include forming an absorptive polarizer (Pa) on a long (oriented) substrate (B) as shown in FIG. 5A, continuously placing it on a reflective linear polarizer (Pr) by a roll-to-roll process as shown in FIG. 5B, and then separating the long (oriented) substrate (B), so that the absorptive polarizer (Pa) is transferred onto the reflective linear polarizer (Pr) as shown in FIG. 5C. In particular, the oriented substrate generally has birefringence and therefore can function to change the state of polarization of light transmitted through the absorptive polarizer when incorporated in a liquid crystal display. If this is disadvantageous for the optical design of a liquid crystal display, the long oriented substrate should preferably be separated or removed.

In addition, the absorptive polarizer including a liquid crystal polymer layer containing a dichroic dye is relatively thin and poor in self-supportability. Even when the oriented substrate is removed, therefore, the lamination is preferably achieved by a transfer method including once placing the absorptive polarizer together with the oriented substrate on the reflective linear polarizer and then separating the oriented substrate.

The lamination method may be performed by simply placing the respective layers on each other. In view of workability or light use efficiency, however, the lamination method is preferably performed by laminating the respective layers with an adhesive or a pressure-sensitive adhesive without forming air gaps.

The adhesive or the pressure-sensitive adhesive to be used is not particularly limited and may be appropriately selected from adhesives or pressure-sensitive adhesives containing, as a base polymer, an acryl based polymer, a silicone based polymer, polyester, polyurethane, polyamide, polyvinyl ether, a vinyl acetate-vinyl chloride based copolymer, modified polyolefin, an epoxy based polymer, a fluorinated polymer, or rubber such as natural rubber or synthetic rubber. In particular, adhesives and pressure-sensitive adhesives having a high level of optical transparency and weather or heat resistance and exhibiting an appropriate level of wettability and adhesion properties such as cohesiveness and adherability are preferably used.

The adhesive or the pressure-sensitive adhesive is preferably transparent, preferably has no absorption in the visible light wavelength range, and preferably has a refractive index as close as possible to that of each layer, in order to suppress surface reflection. From this point of view, for example, acrylic pressure-sensitive adhesives or the like are preferably used.

The adhesive or the pressure-sensitive adhesive may contain a crosslinking agent suitable for the base polymer. The adhesive may also contain additives such as natural or synthetic resin, particularly, tackifying resin, a binder composed of glass fibers, glass beads, metal powder, or any other inorganic powder, a pigment, a colorant, and an antioxidant. Adhesive layers as disclosed in JP-A Nos. 2000-347006 and 2000-347007 which are less likely to cause depolarization and have the property of diffusing light with small back scattering may also be used.

In an embodiment of the invention, the ability to absorb ultraviolet light may be imparted to the film or each layer such as the pressure-sensitive adhesive layer, for example, by treatment with an ultraviolet absorbing agent such as a salicylate ester compound, a benzophenol compound, a benzotriazole compound, a cyanoacrylate compound, or a nickel complex salt compound.

The pressure-sensitive adhesive layer may be formed on the film by any appropriate method, examples of which include: a method including dissolving or dispersing a base polymer or a composition thereof in an appropriate single solvent such as toluene or ethyl acetate or a mixture thereof to prepare an about 10 to 40% by weight pressure-sensitive adhesive solution and directly applying the solution to a polarizing plate or an optical film by any appropriate spreading method such as casting or coating; and a method including forming a pressure-sensitive adhesive layer on a separator and transferring it onto a polarizing plate or an optical film similarly to the method described above.

The pressure-sensitive adhesive layer or the adhesive layer may also be formed as a laminate of layers different in composition, type or the like on one or both sides of the film. When pressure-sensitive adhesive layers are provided on both sides, they may be different in composition, type, thickness, or the like between the front and back sides of the polarizing plate or the optical film. The thickness of the pressure-sensitive adhesive layer is generally from 1 to 500 µm, preferably from 5 to 200 µm, particularly preferably from 10 to 100 µm, while it may be determined depending on the purpose of use, adhering strength or the like.

The exposed surface of the pressure-sensitive adhesive layer is preferably temporarily covered with a separator for antifouling or the like until it is put to use. This can prevent contact with the pressure-sensitive adhesive layer during usual handling. According to conventional techniques, appropriate separators may be used such as appropriate thin leaves including plastic films, rubber sheets, paper, cloth, nonwoven fabric, net, foam sheets, metal leafs, and laminates thereof, which are optionally coated with any appropriate release agent such as a silicone, long-chain alkyl or fluoride release agent, or molybdenum sulfide.

The long laminated polarizing plate obtained as described above is suitable for use in image displays such as liquid crystal displays. Such liquid crystal displays may be formed according to conventional techniques. Specifically, a liquid crystal display is generally formed by properly assembling components such as a liquid crystal cell, polarizing plates or optical films, and optionally a light source and so on, and incorporating a driving circuit and so on. Specifically, as shown in FIG. 4, the long laminated polarizing plate (PL) of the invention is used as a light source-side polarizing plate (P1), which is placed between a liquid crystal cell (LC) and a light source (BL) in such a manner that the reflective linear polarizer (Pr) and the absorptive polarizer (Pa) are located on the light source (BL) side and the liquid crystal cell (LC) side, respectively.

As shown in FIG. 3, the liquid crystal display of the invention includes a viewer-side polarizing plate (P2) and a light source-side polarizing plate (P1), wherein the transmission axes of the viewer-side polarizing plate (P2) and the light source-side polarizing plate (P1) are arranged orthogonal to each other. In order to increase the visibility of the liquid crystal display, an absorptive polarizing plate (Pb) having a transmission axis in the width direction is preferably used as the viewer-side polarizing plate (P2). An iodine polarizing plate is preferably used as the absorptive polarizing plate (Pb).

In the liquid crystal display of the invention, the transmission axis of the long laminated polarizing plate of the invention used as a light source-side polarizing plate is also preferably parallel to the direction of the long side of the liquid crystal display, and the transmission axis of the viewer-side polarizing plate is also preferably parallel to the short side of the liquid crystal display. As shown in FIG. 1B, such an arrangement makes it possible to cut the polarizing plate in such a manner that the direction of the width of the long polarizing plate becomes parallel to the direction of the short side of the liquid crystal display, so that the liquid crystal display can have a larger screen than the case where the conventional polarizing plate shown in FIG. 1A is used.

Examples of a liquid crystal cell used in the liquid crystal display include various liquid crystal cells such as twisted nematic (TN) mode, supertwisted nematic (STN) mode, homogeneous alignment (ECB) mode, vertical alignment (VA) mode, in plane switching (IPS) mode, fringe field switching (FFS) mode, bend nematic (OCB) mode, hybrid alignment (HAN) mode, ferroelectric liquid crystal (SSFLC) mode, and antiferroelctric liquid crystal (AFLC) mode liquid crystal cells.

As backlight, direct under-type backlight, sidelight-type backlight, and planner light source can be used. Further, upon formation of a liquid crystal display, one or more layers of an appropriate component such as a diffusion plate, an antiglare layer, a reflection preventing layer, a protecting plate, a prism array, a lens array sheet, and a light diffusion plate can be arranged at an appropriate position.

In an embodiment of the invention, the long laminated polarizing plate to be used may be provided with a transparent protective layer, which is placed, according to a conventional technique, between the reflective linear polarizer and the absorptive polarizer or between the absorptive polarizer and the liquid crystal cell or on one or both sides of the viewer-side polarizing plate. Such a transparent protective layer may be placed in the process of forming a liquid crystal display. In view of workability or the like, however, the transparent protective layer is preferably formed in advance as a polymer coating layer or in the form of a laminate of layers on the polarizer and then incorporated into a liquid crystal display.

Preferable Materials that form the transparent protective layer is the thermoplastics having outstanding transparency, mechanical strength, heat stability and outstanding moisture interception property, or the like. As thermoplastics of the above-mentioned transparent protective layer, for example, cellulose resins such as triacetylcellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective layer is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective layer. The transparent protective layer may also contain at least one type of any appropriate additive. Examples of the additive include another resin, an ultraviolet absorbing agent, an antioxidant, a lubricant, a plasticizer, a release agent, an antidiscoloration agent, a flame retardant, a nucleating agent, an antistatic agent, a pigment, and a colorant. The content of the thermoplastic resin in the transparent protective layer is preferably from 50 to 100% by weight, more preferably from 50 to 99% by weight, still more preferably from 60 to 98% by weight, particularly preferably from 70 to 97% by weight. If the content of the thermoplastic resin in the transparent protective layer is 50% by weight or less, high transparency and other properties inherent in the thermoplastic resin can fail to be sufficiently exhibited.

Moreover, as is described in JP-A No. 2001-343529 (WO 01/37007), polymer films, for example, resin compositions including (A) thermoplastic resins having substituted and/or non-substituted imido group in side-chain, and (B) thermoplastic resins having substituted and/or non-substituted phenyl and nitrile group in side-chain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

Thickness of the transparent protective layer can be properly determined and generally in the range of from about 1 to about 500 μm from the viewpoint of a strength, workability such as handlability, requirement for a thin film and the like. Especially, the thickness is preferably in the range of from 1 to 300 μm and more preferably in the range of from 5 to 200 μm. Therefore, it is particularly preferred that the transparent protective layer has a thickness of 5 to 150 μm.

Note that in a case where the transparent protective layers are provided on both sides of a polarizer, protective films made from the same polymer may be used on both sides thereof or alternatively, protective films made from polymer materials different from each other may also be used on respective both sides thereof.

At least one selected from a cellulose resin, a polycarbonate resin, a cyclic polyolefin resin, and a (meth)acrylic resin is preferably used for the transparent protective layer in the present invention.

The cellulose resin is an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred. Much commercially available triacetyl celluloses are placing on sale and are advantageous in view of easy availability and cost. Examples of commercially available products of triacetyl cellulose include UV-50, UV-80, SH-80, TD-80U, TD-TAC, and UZ-TAC (trade names) manufactured by Fujifilm Corporation, and KC series manufactured by Konica Minolta. In general, these triacetyl cellulose products have a thickness direction retardation (Rth) of about 60 nm or less, while having an in-plane retardation (Re) of almost zero.

Cellulose resin films with relatively small thickness direction retardation may be obtained by processing any of the above cellulose resins. Examples of the processing method include a method that includes laminating a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for 3 to 10 minutes) and then separating the base film; and a method that includes coating a general cellulose resin film with a solution of a norbornene resin, a (meth)acrylic resin or the like in a solvent such as cyclopentanone or methyl ethyl ketone, drying the coated film by heating (for example, at 80 to 150° C. for 3 to 10 minutes), and then separating the coating.

The cellulose resin film with a relatively small thickness direction retardation to be used may be a fatty acid cellulose resin film with a controlled degree of fat substitution. While triacetyl cellulose for general use has a degree of acetic acid substitution of about 2.8, preferably, the degree of acetic acid substitution is controlled to 1.8 to 2.7, so that the Rth can be reduced. The Rth may also be controlled to be low by adding a plasticizer such as dibutyl phthalate, p-toluenesulfonanilide, and acetyl triethyl citrate, to the fatty acid-substituted cellulose resin. The plasticizer is preferably added in amount of 40 parts by weight or less, more preferably of 1 to 20 parts by weight, still more preferably of 1 to 15 parts by weight, to 100 parts by weight of the fatty acid cellulose resin.

For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

The (meth)acrylic resin preferably has a glass transition temperature (Tg) of 115° C. or more, more preferably of 120° C. or more, still more preferably of 125° C. or more, particularly preferably of 130° C. or more. If the Tg is 115° C. or more, the resulting polarizing plate can have good durability. The upper limit to the Tg of the (meth)acrylic resin is preferably, but not limited to, 170° C. or less, in view of formability and the like. The (meth)acrylic resin can form a film with an in-plane retardation (Re) of almost zero and a thickness direction retardation (Rth) of almost zero.

Any appropriate (meth)acrylic resin may be used as long as the advantages of the present invention are not reduced. Examples of such a (meth)acrylic resin include poly(meth)

acrylate such as poly(methyl methacrylate), methyl methacrylate-(meth)acrylic acid copolymers, methyl methacrylate-(meth)acrylate copolymers, methyl methacrylate-acrylate-(meth)acrylic acid copolymers, methyl (meth) acrylate-styrene copolymers (such as MS resins), and alicyclic hydrocarbon group-containing polymers (such as methyl methacrylate-cyclohexyl methacrylate copolymers and methyl methacrylate-norbornyl (meth)acrylate copolymers). Poly(C1-6 alkyl (meth)acrylate) such as poly(methyl (meth)acrylate) is preferred, and a methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used, because they have high heat resistance and high transparency and also have high mechanical strength after biaxially stretched.

Examples of the lactone ring structure-containing (meth) acrylic reins include the lactone ring structure-containing (meth)acrylic reins disclosed in JP-A Nos. 2000-230016, 2001-151814, 2002-120326, 2002-254544, and 2005-146084.

The lactone ring structure-containing (meth)acrylic reins preferably have a ring structure represented by Formula 1

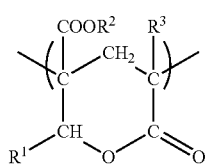

[Formula 1]

In the formula 1 above, $R^1$, $R^2$ and $R^3$ each independently represent a hydrogen atom or an organic residue of 1 to 20 carbon atoms. The organic residue may contain an oxygen atom(s).

The content of the lactone ring structure represented by Formula 1 in the lactone ring structure-containing (meth) acrylic resin is preferably from 5 to 90% by weight, more preferably from 10 to 70% by weight, still more preferably from 10 to 60% by weight, particularly preferably from 10 to 50% by weight. If the content of the lactone ring structure represented by Formula 1 in the lactone ring structure-containing (meth)acrylic resin is less than 5% by weight, its heat resistance, solvent resistance or surface hardness can be insufficient. If the content of the lactone ring structure represented by Formula 1 in the lactone ring structure-containing (meth)acrylic resin is more than 90% by weight, its formability or workability can be poor.

The lactone ring structure-containing (meth)acrylic resin preferably has a mass average molecular weight (also referred to as weight average molecular weight) of 1,000 to 2,000,000, more preferably of 5,000 to 1,000,000, still more preferably of 10,000 to 500,000, particularly preferably of 50,000 to 500,000. A mass average molecular weight outside the above range is not preferred in view of formability or workability.

The lactone ring structure-containing (meth)acrylic resin preferably has a Tg of 115° C. or more, more preferably of 120° C. or more, still more preferably of 125° C. or more, particularly preferably of 130° C. or more. For example, the resin with a Tg of 115° C. or more can produce good durability, when it is incorporated in the form of a transparent protective layer in a polarizing plate. The upper limit to the Tg of the lactone ring structure-containing (meth)acrylic resin is preferably, but not limited to, 170° C. or less in view of formability and the like.

The total light transmittance of the lactone ring structure-containing (meth)acrylic resin, which may be measured according to ASTM-D-1003 with respect to injection molded products, is preferably as high as possible, and specifically, it is preferably 85% or more, more preferably 88% or more, still more preferably 90% or more. The total light transmittance is an index of transparency, and a total light transmittance of less than 85% can result in reduced transparency.

The transparent protective layer to be used generally has an in-plane retardation of less than 40 nm and a thickness direction retardation of less than 80 nm. The in-plane retardation Re is expressed by the formula $Re=(nx-ny)\times d$, the thickness direction retardation Rth is expressed by the formula $Rth=(nx-nz)\times d$, and the Nz coefficient is represented by the formula $Nz=(nx-nz)/(nx-ny)$, where nx, ny and nz are the refractive indices of the film in the directions of its slow axis, fast axis and thickness, respectively, d is the thickness (nm) of the film, and the direction of the slow axis is a direction in which the in-plane refractive index of the film is maximum. Moreover, it is preferable that the transparent protective layer may have as little coloring as possible. A protective film having a thickness direction retardation of from −90 nm to +75 nm may be preferably used. Thus, coloring (optical coloring) of polarizing plate resulting from a transparent protective layer may mostly be cancelled using a protective film having a thickness direction retardation (Rth) of from −90 nm to +75 nm. The thickness direction retardation (Rth) of the transparent protective layer is preferably from −80 nm to +60 nm, and especially preferably from −70 nm to +45 nm.

Alternatively, the transparent protective layer to be used may be a retardation plate having an in-plane retardation of 40 nm or more and/or a thickness direction retardation of 80 nm or more. The in-plane retardation is generally controlled in the range of 40 to 200 nm, and the thickness direction retardation is generally controlled in the range of 80 to 300 nm. The retardation plate for use as the transparent protective layer also has the function of the transparent protective layer and thus can contribute to a reduction in thickness.

Examples of the retardation plate include a birefringent film produced by uniaxially or biaxially stretching a polymer material, an oriented liquid crystal polymer film, and an oriented liquid crystal polymer layer supported on a film. The thickness of the retardation plate is generally, but not limited to, from about 20 to about 150 μm.

Examples of the polymer material used for the retardation plate include polyvinyl alcohol, polyvinyl butyral, poly(methyl vinyl ether), poly(hydroxyethyl acrylate), hydroxyethyl cellulose, hydroxypropyl cellulose, methylcellulose, polycarbonate, polyarylate, polysulfone, polyethylene terephthalate, polyethylene naphthalate, polyethersulfone, polyphenylene sulfide, polyphenylene oxide, polyallylsulfone, polyamide, polyimide, polyolefin, polyvinyl chloride, cellulose resins, cyclic polyolefin resins (norbornene reins), and various types of binary or ternary copolymers thereof, graft copolymers thereof, and any blend thereof. Any of these polymer materials may be formed into an oriented product (a stretched film) by stretching or the like.

Examples of the liquid crystal polymer include various main-chain or side-chain types having a liquid crystal molecular orientation property-imparting conjugated linear atomic group (mesogen) introduced in a main or side chain of a polymer. Examples of the main chain type liquid crystal polymer include polymers having a mesogen group bonded thereto via a flexibility-imparting spacer moiety, such as nematically ordered polyester liquid-crystalline polymers, discotic polymers, and cholesteric polymers. For example, the side-chain type liquid crystal polymer may be a polymer comprising: a main chain skeleton of polysiloxane, polyacrylate, polymethacrylate, or polymalonate; and a side chain having a mesogen moiety that comprises a nematic orientation-imparting para-substituted cyclic compound unit and is bonded thereto via a spacer moiety comprising a conjugated atomic group. For example, any of these liquid crystal polymers may be applied by a process that includes spreading a solution of the liquid crystalline polymer on an alignment surface such as a rubbed surface of a thin film of polyimide, polyvinyl alcohol or the like, formed on the glass plate, and an obliquely vapor-deposited silicon oxide surface, and heat-treating it.

The retardation plate may have any appropriate retardation depending on the intended use such as compensation for coloration, viewing angle, or the like due to the birefringence of various wave plates or liquid crystal layers. Two or more types of retardation plates may also be laminated to provide controlled optical properties, including retardation.

A retardation plate satisfying the relation: nx=ny>nz, nx>ny=nz, nx>ny=nz, nx>nz>ny, nz=nx>ny, nz>nx>ny, or nz>nx=ny may be selected and used depending on various applications. The relation ny=nz includes not only the case where ny is completely equal to nz but also the case where ny is substantially equal to nz.

For example, the retardation plate satisfying the relation nx>ny>nz to be used preferably has a in-plane retardation of 40 to 100 nm, a thickness retardation of 100 to 320 nm, and an Nz coefficient of 1.8 to 4.5. For example, the retardation plate satisfying the relation nx>ny=nz (positive A plate) to be used preferably has an in-plane retardation of 100 to 200 nm. For example, the retardation plate satisfying the relation nz=nx>ny (negative A plate) to be used preferably has an in-plane retardation of 100 to 200 nm. For example, the retardation plate satisfying the relation nx>nz>ny to be used preferably has an in-plane retardation of 150 to 300 nm and an Nz coefficient of more than 0 and not more than 0.7. As described above, for example, the retardation plate satisfying the relation nx=ny>nz, nz>nx>ny or nz>nx=ny may also be used.

The transparent protective layer may be appropriately selected depending on the liquid crystal display to be produced therewith. In the case of VA (Vertical Alignment, including MVA and PVA), it is preferred that the transparent protective layer on at least one side of the polarizing plate (on the cell side) has a retardation. Specifically, it preferably has a retardation Re in the range of 0 to 240 nm and a retardation Rth in the range of to 500 nm. In terms of three-dimensional refractive index, the case of nx>ny=nz, nx>ny>nz, nx>nz>ny, or nx=ny>nz (uniaxial, biaxial, Z conversion, negative C-plate) is preferred. When polarizing plates are used on upper and lower sides of a liquid crystal cell, the transparent protective layers may have a retardation on upper and lower sides of the liquid crystal cell, or one of the upper and lower transparent protective layers may has a retardation.

For example, in the case of IPS (In-Plane Switching, including FFS), the transparent protective layer for use in one of the polarizing plates may have or may not have a retardation. For example, a transparent protective layer with no retardation is preferably provided on both upper and lower sides of a liquid crystal cell (cell sides), or otherwise a transparent protective layer with a retardation is preferably provided on both or one of the upper and lower sides of a liquid crystal cell (for example, Z conversion on the upper side with no retardation on the lower side or an A-plate provided on the upper side with a positive C-plate provided on the lower side). When it has a retardation, it preferably has a retardation Re in the range of −500 to 500 nm and a retardation Rth in the range of −500 to 500 nm. In terms of three-dimensional refractive index, nx>ny=nz, nx>nz>ny, nz>nx=ny, or nz>nx>ny (uniaxial, Z conversion, positive C-plate, positive A-plate) is preferred.

The film with retardation may be separately prepared and laminated to a transparent protective layer with no retardation so that the function described above can be provided.

The polarizer or the transparent protective layer may be subjected to surface modification treatment before it is applied with the adhesive. Specific examples of such treatment include corona treatment, plasma treatment, primer treatment, saponification treatment, and coupling agent treatment.

A hard coat layer may be prepared, or antireflection processing, processing aiming at sticking prevention, diffusion or anti glare may be performed onto the face on which the polarizer of the above described transparent protective layer has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the transparent protective layer using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the transparent protective layer using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 70 weight parts to the transparent resin 100 weight parts that forms the fine concavo-convex structure on the surface, and preferably 5 to 50 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc.

may be built in the transparent protective layer itself, and also they may be prepared as an optical layer different from the transparent protective layer.

Adhesion between the transparent protective layer and the polarizer is carried out with an adhesive. Examples of such an adhesive include isocyanate-based adhesives, polyvinyl alcohol-based adhesives, gelatin-based adhesives, vinyl-based latexes, and water-based polyesters. The adhesive is generally used as an aqueous adhesive solution having a solid content of 0.5 to 60% by weight. Other examples of the adhesive between the polarizer and the transparent protective layer include an ultraviolet curable adhesive, and an electron beam curing adhesive. The electron beam curable adhesive for polarizing plate exhibits an appropriate adhesive property for the above-mentioned various transparent protective layer films, and exhibits a good adhesive property, in particular, for acrylic resin, which has not easily been caused to adhere satisfactorily.

As described above, an adhesion between the transparent protective layer and the polarizer is carried out by laminating thereof with the adhesive described above. The adhesive can be applied onto either the transparent protective layer or the polarizer or both. After the transparent protective layer and the polarizer are laminated together with an adhesive, they are dried to form an adhesive layer comprising a dried coating layer. Lamination between the transparent protective layer and the polarizer can be carried out with, for example, a roll laminator. The thickness of the adhesive layer is not particularly limited, but is generally in the range of about 30 to 1000 nm.

Further, in an embodiment of the present invention, one layer or two layers or more of optical layers, that are used for manufacturing a liquid crystal display etc., such as a reflective plate, a transflective plate, a retardation plate (including half or quarter wavelength plates), and a viewing angle compensation film, may be adopted between a long laminated polarizing plate and a liquid crystal cell (LC), or between a viewer-side polarizing plate and a liquid crystal cell. Especially, an elliptically polarizing plate or a circular polarizing plate in which a retardation plate is further laminated onto a long laminated polarizing plate of the invention, a wide viewing angle polarizing plate in which a viewing angle compensation film is further laminated onto a long laminated polarizing plate of the invention may preferably be mentioned.

A description of the elliptically polarizing plate or circularly polarizing plate in which the retardation plate is laminated to the polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyarylates and polyamides; aligned films comprising liquid crystal materials, such as liquid crystal polymer; and films on which an alignment layer of a liquid crystal material is supported may be mentioned. A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display etc.

A viewing angle compensation film is a film for extending viewing angle so that a picture may look comparatively clearly, even when it is viewed from an oblique direction not from vertical direction to a screen. As such a viewing angle compensation retardation plate, for example, a plate having a constitution in which orientation layers, such as a retardation plate, alignment films made of a liquid crystal polymer, and a alignment layer made of liquid crystal polymer supported on transparent base materials, may be mentioned. In a usual retardation plate, a polymer film having a birefringence is used that is stretched uniaxially in a plane direction, but as a retardation plate used as a viewing angle compensation film a polymer film having a birefringence stretched biaxially in a plane direction, a polymer having a birefringence that is stretched uniaxially in a plane direction and also in a thickness direction and that has further a controlled refractive index in a thickness direction, and a biaxially stretched film like a tilted alignment film may be used. As a tilted alignment film, for example, a film in which a polymer film adhered with a heat shrinking film is heated, and is stretched and/or shrunk in the state where shrinking strength is activated, and a film in which a liquid crystal polymer has tilted alignment may be mentioned. The same polymer as described above for the retardation plate may be used as a raw material polymer for the retardation plate. Any appropriate raw material polymer for preventing coloration caused by viewing angle changes based on the retardation of the liquid crystal cell or for widening the viewing angle of good visibility may be used.

Besides, a compensation retardation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

A pressure-sensitive adhesive layer or layers for adhering to any other member such as a liquid crystal cell may be provided on one or both sides of the polarizing plate described above or the optical film including at least one layer of the polarizing plate. Examples of the pressure-sensitive adhesive and the method used to form the pressure-sensitive adhesive layer include, but are not limited to, those described above suitable for use in laminating the reflective linear polarizer and the absorptive polarizer. The exposed surface of the pressure-sensitive adhesive layer or the like is preferably temporarily covered with a separator for antifouling or the like until it is put to use.

EXAMPLES

The invention is further described using the EXAMPLES below, which are not intended to limit the scope of the invention.

Example 1

A 1,300 mm wide, long reflective linear polarizer (D-BEF, manufactured by 3M, 87% in polarization degree) having a transmission axis in the longitudinal direction was corona treated. A 1,250 mm wide coating of a lyotropic liquid crystalline dye (LC Polarizer, manufactured by Optiva Inc.) was formed thereon using a roll coater and then dried at 80° C. for 2 minutes to form an absorptive polarizer having a transmission axis in the longitudinal direction, so that a long laminated polarizing plate was obtained.

Reference Example 1

Figure 6:
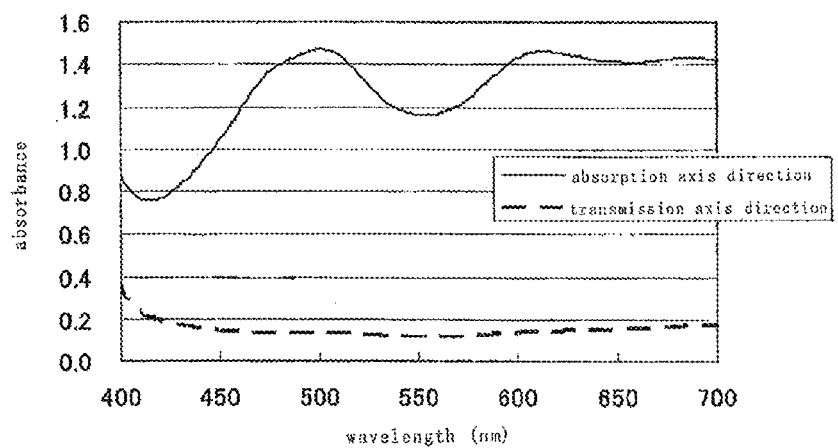
FIG. 6 shows an absorption spectrum in each of the transmission axis direction and the absorption axis direction of a polarizer in Reference Example 1.

An absorptive polarizer of a lyotropic liquid crystalline dye was formed on a triacetylcellulose (TAC) film by coating in the same manner as in Example 1. Using a TAC film with no polarizer coating as a reference, the absorption spectrum of the absorptive polarizer was measured with a spectrophotometer U4100 manufactured by Hitachi, Ltd. for each of linearly polarized light beams in the transmission axis direction (the film feeding direction in the coating process) and in the absorption axis direction (orthogonal to the feeding direction) through a prism polarizer. The absorption spectrum is shown in FIG. 6. The absorbance for light at 550 nm was 0.117 in the transmission axis direction and 1.163 in the absorption axis direction.

Example 2

A 1,250 mm wide coating of a 20% by weight cyclopentanone solution of a mixture of a diacryl liquid crystal monomer (Paliocolor LC-242, manufactured by BASF), a polymerization initiator (Irgacure 906, manufactured by Ciba Specialty Chemicals Inc.) and a dichroic dye (S-428, manufactured by Mitsui Chemicals, Inc.) (97:3:0.5 in weight ratio) was formed using a gravure roll coater on a 1,330 mm wide PET film (Lumirror, manufactured by TORAY INDUSTRIES, INC.) having an orientation axis in the width direction. The coating was dried at 80° C. for 2 minutes and then cured by ultraviolet irradiation with an integrated light quantity of 300 mJ to form an absorptive polarizer layer having a transmission axis in the longitudinal direction.

Using an acrylic pressure-sensitive adhesive, the resulting absorptive polarizer layer was transferred from the PET film onto the same long reflective linear polarizer as used in Example 1 by a roll-to-roll process in such a manner that the transmission axes of both polarizers were parallel to each other, so that a long laminated polarizing plate was obtained.

Reference Example 2

Figure 7:
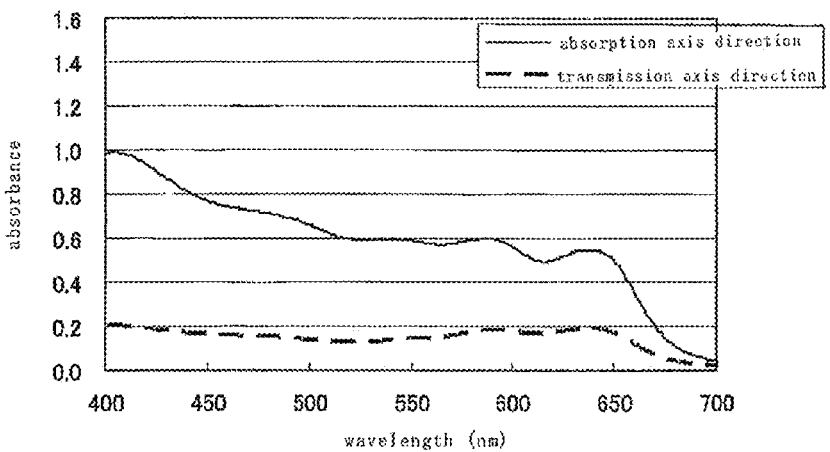
FIG. 7 shows an absorption spectrum in each of the transmission axis direction and the absorption axis direction of a polarizer in Reference Example 2.

The same absorptive polarizer layer as that in Example 2 was transferred from the PET film onto a TAC film, and the absorption spectrum was measured in the same manner as in Reference Example 1. The absorption spectrum is shown in FIG. 7. The absorbance for light at 550 nm was 0.143 in the transmission axis direction and 0.589 in the absorption axis direction.

Example 3

A long laminated polarizing plate was obtained using the process of Example 1, except that the reflective linear polarizer used was prepared by laminating two pieces of the same long reflective linear polarizer as that in Example 1 by a roll-to-roll process in such a manner that both the transmission axes were parallel to each other. The laminate of the two pieces of the reflective polarizer had a polarization degree of 95%.

Example 4

A long laminated polarizing plate was obtained using the process of Example 1, except that the coating thickness of the liquid crystal layer of the absorptive polarizer was increased. The absorption spectrum of only the absorptive polarizer layer was measured in the same manner as in Reference Example 1. As a result, the absorbance for light at 550 nm was 0.210 in the transmission axis direction and 2.037 in the absorption axis direction.

Example 5

A long laminated polarizing plate was obtained using the process of Example 1, except that the coating thickness of the liquid crystal layer of the absorptive polarizer was reduced. The absorption spectrum of only the absorptive polarizer layer was measured in the same manner as in Reference Example 1. As a result, the absorbance for light at 550 nm was 0.047 in the transmission axis direction and 0.458 in the absorption axis direction.

Example 6

A commercially-available IPS mode liquid crystal panel (WO07000, manufactured by Hitachi, Ltd.) was used. The long laminated polarizing plate obtained in Example 1 was so cut that its transmission axis was parallel to the direction of the long side of the panel and placed as a light source-side polarizing plate on the panel. An iodine polarizing plate (SEG1423DU, manufactured by NITTO DENKO CORPORATION) was placed as a viewer-side polarizing plate on the panel in such a manner that its transmission axis was parallel to the short side of the panel, so that a liquid crystal display was obtained. Under external light at an illuminance of 200 lx, the resulting liquid crystal display was examined for visibility observed in the normal direction during black display (when the voltage was OFF), visibility obliquely observed at an azimuth angle of 45° and a polar angle of 60° during black display, and visibility observed in the normal direction during white display (when the voltage was ON). The results are shown in Table 1.

Examples 7 to 10 and Comparative Examples 1 and 2

Liquid crystal displays were prepared using the process of Example 6, except that the long laminated polarizing plates of Examples 2 to 5, a reflective linear polarizer (D-BEF), and an iodine absorptive polarizing plate (SEG1423DU, manufactured by NITTO DENKO CORPORATION) were each used as the light source-side polarizing plate, and visibility and obliquely observed visibility were examined. The results are shown in Table 1. Concerning the examples and the comparative examples, calculations were made of the maximum screen size (in the long side direction) that would be possible when the light source-side polarizing plate and the viewer-side polarizing plate were arranged with their transmission axes orthogonal to each other in a wide liquid crystal display with a screen aspect ratio of 16:9. The results are also shown in Table 1.

TABLE 1

| | Light source-side polarizing plate | Visibility in normal direction | | Visibility in oblique direction | Potential maximum screen size |
|---|---|---|---|---|---|
| | | Black display | White display | Black display | |
| Example 6 | Example 1 | ○ | ○ | ○ | 2222 mm |
| Example 7 | Example 2 | ○ | ○ | ▲ | 2222 mm |
| Example 8 | Example 3 | ⊙ | ○ | ⊙ | 2222 mm |
| Example 9 | Example 4 | ○ | ▲ | ⊙ | 2222 mm |
| Example 10 | Example 5 | Δ | Δ | ○ | 2222 mm |
| Comparative Example 1 | Iodine polarizing plate | ⊙ | ○ | Δ | 1250 mm |
| Comparative Example 2 | D-BEF | X | X | X | 2222 mm |

White display
○: The screen was bright, and good display was obtained.
Δ: The screen was bright, but external light reflection was observed.
▲: No external light reflection was observed, but the screen was dark.
X: Mirror-like glossy reflection of external light occurred, so that the visibility was low.
Black display
⊙: Black display was achieved.
○: Light leakage occurred, but substantially good black display was achieved.
Δ: Light leakage made the screen bleached-looking.
X: Mirror-like glossy reflection of external light occurred, so that the visibility was low.

As a result of a comprehensive evaluation, the whole visibility was ranked in the following order: Example 8>Comparative Example 1>Example 6>Example 7>Example 10>Example 9>>Comparative Example 2. Comparative Example 1 had good visibility particularly in the normal direction but was less suitable for large screens than the examples of the invention.

The invention claimed is:

1. A roll of a long laminated polarizing plate in the form of a film, comprising:
    at least one layer of a reflective linear polarizer having a transmission axis parallel to the longitudinal direction of the film; and
    at least one layer of an absorptive polarizer having a transmission axis parallel to the longitudinal direction of the film, wherein
    both the transmission axes are arranged parallel to each other,
    the long laminated polarizing plate has a length of 1,500 mm or more,
    at a wavelength of 550 nm, the absorptive polarizer has an absorbance of 0.2 or less for linearly polarized light in the direction of the transmission axis and an absorbance of 0.5 to 2.5 for linearly polarized light in the direction of the absorption axis,
    the reflective linear polarizer has a polarization degree of 80% or more, and
    the film has a width of 850 mm or more.

2. The roll of a long laminated polarizing plate of claim 1, wherein the absorptive polarizer contains at least one of a material having a fixed orientation and lyotropic liquid crystal properties, a homogeneously-oriented thermotropic liquid crystal polymer, and a homogeneously-oriented crosslinking liquid crystal polymer.

3. The roll of a long laminated polarizing plate of claim 1, wherein said longitudinal direction of the film is a film feeding direction from the roll and wherein said at least one layer of an absorptive polarizer having a transmission axis parallel to the longitudinal direction of the film feeds from another roll and said longitudinal direction of the film is a film feeding direction from the another roll.

4. The roll of a long laminated polarizing plate of claim 1, wherein said longitudinal direction is a feeding direction of said roll.

5. A method for producing the roll of a long laminated polarizing plate of claim 1, comprising the steps of:
    applying, to a long substrate, a solution containing a dichroic dye having lyotropic liquid crystal properties, while applying shear in the longitudinal direction of the long substrate, and fixing an orientation, so that an absorptive polarizer is formed; and
    placing the absorptive polarizer on a reflective linear polarizer having a transmission axis parallel to the longitudinal direction of the film.

6. The method of claim 5, wherein the reflective linear polarizer and the absorptive polarizer are placed on each other by a roll-to-roll process in such a manner that their transmission axes are parallel to each other.

7. A method for producing the roll of a long laminated polarizing plate of claim 1, comprising the step of:
    applying a solution containing a dichroic dye having lyotropic liquid crystal properties to a reflective linear polarizer having a transmission axis parallel to the longitudinal direction of the film, while applying shear in the longitudinal direction of the reflective linear polarizer, and fixing an orientation, so that an absorptive polarizer is formed.

8. A method for producing the roll of a long laminated polarizing plate of claim 1, comprising the steps of:
    applying a solution containing a liquid crystal monomer having a polymerizable functional group and a dichroic dye to a long oriented substrate having an orientation axis in the width direction;

polymerizing the liquid crystal monomer to produce a homogenous orientation, so that an absorptive polarizer having a transmission axis parallel to the longitudinal direction of the film is formed; and placing the absorptive polarizer on a reflective linear polarizer having a transmission axis parallel to the longitudinal direction of the film.

9. The method of claim 8, wherein the long oriented substrate is a stretched film that is stretched at least in the width direction.

10. The method of claim 8, wherein the reflective linear polarizer and the absorptive polarizer are placed on each other by a roll-to-roll process in such a manner that their transmission axes are parallel to each other.

11. A method for producing the roll of a long laminated polarizing plate of claim 1, comprising the steps of:

applying a solution containing a thermotropic liquid crystal polymer and a dichroic dye to a long oriented substrate having an orientation axis in the width direction;

heating the liquid crystal polymer to its liquid crystal transition temperature or higher;

then cooling the liquid crystal polymer to fix its orientation so that the polymer is homogeneously oriented to form an absorptive polarizer having a transmission axis parallel to the longitudinal direction of the film; and placing the absorptive polarizer on a reflective linear polarizer having a transmission axis parallel to the longitudinal direction of the film.

12. The method of claim 11, wherein the long oriented substrate is a stretched film that is stretched at least in the width direction.

13. The method of claim 11, wherein the reflective linear polarizer and the absorptive polarizer are placed on each other by a roll-to-roll process in such a manner that their transmission axes are parallel to each other.

14. A method for producing the roll of a long laminated polarizing plate of claim 1, comprising the steps of:

feeding said at least one layer of a reflective linear polarizer having a transmission axis parallel to the longitudinal direction of the film from the roll in which said longitudinal direction of the film is a film feeding direction from the roll; and feeding said at least one layer of an absorptive polarizer having a transmission axis parallel to the longitudinal direction of the film from another roll in which said longitudinal direction of the film is a film feeding direction from the another roll.

15. A liquid crystal display, comprising, in this order, a light source, a light source-side polarizing plate, a liquid crystal cell and a viewer-side polarizing plate, wherein the light source-side polarizing plate is a cut piece of the roll of a long laminated polarizing plate of claim 1, the reflective linear polarizer is located on a side close to the light source, the absorptive polarizer is located on a side close to the liquid crystal cell, and the viewer-side polarizing plate is an iodine polarizing plate.

16. The liquid crystal display of claim 15, wherein the light source-side polarizing plate has a transmission axis parallel to a long side of the liquid crystal display, and the viewer-side polarizing plate has a transmission axis parallel to a short side of the liquid crystal display.

* * * * *